US008165296B2

(12) United States Patent
Smith (10) Patent No.: US 8,165,296 B2
(45) Date of Patent: Apr. 24, 2012

(54) TIME OF DAY ENCRYPTION USING TDMA TIMING (75) Inventor: Edward Smith, Escondido, CA (US)

(73) Assignee: ViaSat, Inc., Carlsbad, CA (US)

( * ) Notice: Subject to any disclaimer, the term of this patent is extended or adjusted under 35 U.S.C. 154(b) by 387 days.

(21) Appl. No.: 12/473,104

(22) Filed: May 27, 2009

(65) Prior Publication Data
US 2009/0323952 A1 Dec. 31, 2009

Related U.S. Application Data

(60) Provisional application No. 61/056,772, filed on May 28, 2008, provisional application No. 61/056,425, filed on May 27, 2008.

(51) Int. Cl.
H04K 1/04 (2006.01)
H04K 1/00 (2006.01)
H04L 9/00 (2006.01)
G06F 1/12 (2006.01)
G06F 1/00 (2006.01)
H04N 7/16 (2011.01)

(52) U.S. Cl. .............. 380/255; 380/37; 380/43; 380/44; 380/259; 713/400; 713/500; 725/29

(58) Field of Classification Search .................. 380/255, 380/37, 43, 44, 259; 713/400, 500; 725/29
See application file for complete search history.

(56) References Cited

U.S. PATENT DOCUMENTS

| 4,418,425 | A | | 11/1983 | Fennel, Jr. et al. | |
|---|---|---|---|---|---|
| 5,243,653 | A | * | 9/1993 | Malek et al. | 380/272 |
| 5,644,602 | A | | 7/1997 | Critchlow et al. | |
| 5,987,139 | A | * | 11/1999 | Bodin | 380/44 |
| 6,813,355 | B1 | * | 11/2004 | Hakaste | 380/270 |
| 7,062,287 | B2 | | 6/2006 | Nakamura et al. | |
| 7,215,650 | B1 | | 5/2007 | Miller et al. | |
| 7,242,945 | B2 | | 7/2007 | Reddi | |
| 7,656,813 | B2 | | 2/2010 | Kloper | |
| 7,657,748 | B2 | * | 2/2010 | Gentry | 713/170 |
| 7,899,183 | B2 | * | 3/2011 | Tajima et al. | 380/263 |
| 2002/0037705 | A1 | | 3/2002 | Moerder et al. | |

(Continued)

FOREIGN PATENT DOCUMENTS

JP 61-113326 A 5/1986

(Continued)

OTHER PUBLICATIONS

PCT International Search Report and Written Opinion mailed Oct. 11, 2010; International Application No. PCT/US2009/045349; 9 pages.

(Continued)

*Primary Examiner* — Mohammad Reza
(74) *Attorney, Agent, or Firm* — Kilpatrick Townsend & Stockton LLP (57) ABSTRACT

Embodiments of the invention provide for encryption and decryption of data in a TDMA network using TDMA time values. In some embodiments, TDMA time values can be transmitted to terminals from a network controller using a burst time plan. These TDMA time values along with other data and/or counters can be combined to create a one-time key, which can be used to both encrypt data and/or decrypt data. Embodiments of the invention can decrease communication overhead by using the TDMA time value for TDMA purposes as well as for encryption purposes.

24 Claims, 7 Drawing Sheets

U.S. PATENT DOCUMENTS

| | | | |
|---|---|---|---|
| 2002/0075827 | A1 | 6/2002 | Balogh et al. |
| 2002/0174242 | A1 | 11/2002 | Hindie et al. |
| 2003/0112878 | A1 | 6/2003 | Kloper |
| 2003/0128711 | A1 | 7/2003 | Olariu et al. |
| 2004/0120349 | A1 | 6/2004 | Border et al. |
| 2005/0172129 | A1* | 8/2005 | Tajima et al. ............... 713/171 |
| 2006/0101116 | A1 | 5/2006 | Rittman et al. |
| 2006/0177065 | A1* | 8/2006 | Halbert ................ 380/277 |
| 2007/0155388 | A1 | 7/2007 | Petrovic et al. |
| 2007/0189230 | A1 | 8/2007 | Lee |
| 2007/0276955 | A1 | 11/2007 | Moerder et al. |
| 2008/0008264 | A1 | 1/2008 | Zheng |
| 2009/0296629 | A1 | 12/2009 | Lincoln et al. |
| 2009/0296847 | A1 | 12/2009 | Lee |
| 2009/0323952 | A1 | 12/2009 | Smith |

FOREIGN PATENT DOCUMENTS

| | | | |
|---|---|---|---|
| KR | 10-2004-0043731 A | 5/2004 | |

OTHER PUBLICATIONS

Burg, A., et al., "FPGA Implementation of a MIMO Receiver Front-End for the UMTS Downlink", Proc. International Zurich Seminar on Broadband Communications Access, Feb. 19-21, 2002 Zurich, Switzerland, pp. 8-1-8-6.

Almeida, Carlos Beltran et al., "Testability Issues in the CMS ECAL Upper-level Readout and Trigger System", Proc. of the 5th Workshop on Electronics for LHC Experiments, Oct. 29, 1999, 7 pgs.

PCT International Search Report and Written Opinion mailed Jan. 29, 2009; International Application No. PCT/US2009/045345, 11 pages.

PCT International Search Report and Written Opinion mailed Dec. 29, 2009; International Application No. PCT/US2009/045343, 11 pages.

Almeida, Carlos Beltran et al., "Testability Issues in the CMS ECAL Upper-level Readout and C5 Trigger System", Proc. of the 5th Workshop on Electronics for LHC Experiments, Oct. 29, 1999, 7 pgs.

Non Final Office Action of U.S. Appl. No. 12/472,922, mailed Aug. 24, 2011.

* cited by examiner

TIME OF DAY ENCRYPTION USING TDMA TIMING

CROSS-REFERENCES TO RELATED APPLICATIONS

This application claims the benefit of commonly assigned U.S. Provisional Patent Application No. 61/056,772, filed May 28, 2008, entitled "Time of Day Encryption Using TDMA Timing," and this application claims the benefit of commonly assigned U.S. Provisional Patent Application No. 61/056,425, filed May 27, 2008, entitled "Return Link Power Control and Fault Tolerant Modem Redundancy," the disclosures of which are herein incorporated by reference for all purposes.

BACKGROUND

Communication networks such as mobile phone networks, mobile Internet networks and/or satellite networks use various techniques to provide access for multiple users. Various access and/or multiplexing techniques can be employed. Some techniques can allow parties to communicate using specified frequency bands and/or timeslots. Other techniques can employ code division to allow access to the network. Because multiple parties have access to the network, encryption can be a priority. Various encryption techniques are known in the art that can be used to encrypt data.

BRIEF SUMMARY

Embodiments of the invention provide for encryption and decryption of data in a TDMA network using TDMA time values. In some embodiments, TDMA time values can be transmitted to various terminals from a network controller using, for example, a burst time plan. TDMA time values along with other data and/or counters can be combined to create a one-time key-value. The one-time key-value can be used to both encrypt data and/or decrypt encrypted data. Such embodiments can decrease communication overhead by using the TDMA time value for TDMA purposes as well as for encryption purposes.

In some embodiments, a terminal (e.g., phone, network device, or modem) can be used to encrypt data in a satellite communication network. A TDMA time value can be received at the terminal from a network controller (e.g., through a satellite). In some embodiments, the terminal can include an antenna and or a satellite dish that can be used to receive the TDMA time value. The TDMA time value can be received, for example, in a burst time plan. Data can also be received from a user that is meant to be transmitted to the network controller. In some embodiments, the data can be received from a communication port different than the communication port that received the TDMA time value. A one-time key-value can be calculated using at least the TDMA time value. Other values such as carrier frequency, terminal identification parameters, system parameters, network controller parameters, block counters, etc. can also be used to create the one-time key-value. The one-time key-value can be created from these values using any type of encryption function. The data from the user can then be encrypted using the one-time key-value, for example, by operating on the data and the one-time key-value with an exclusive disjunction operator (e.g., XOR). The encrypted data can then be communicated to the network controller, for example, during a timeslot specified in the burst time plan.

In some embodiments, a network controller (e.g., hub, GCU or gateway) can be used to decrypt data in a satellite communication network. Encrypted data can be received from a terminal through a satellite using an antenna and/or a satellite dish. A one-time key-value can be created from at least a TDMA time value. The TDMA time value can be received from memory and can be the same TDMA time value that was transmitted to the terminals in the latest burst time plan. The encrypted data can be decrypted using the one-time key-value, for example, by using the exclusive disjunction operator (e.g., XOR) on the one-time key-value and the encrypted data. In some embodiments, the one-time key-value can be calculated at a terminal or a network controller using a plurality of TDMA time values that can appended with a consecutively incremented local block counter.

Further areas of applicability of the present disclosure will become apparent from the detailed description provided hereinafter. It should be understood that the detailed description and specific examples, while indicating various embodiments, are intended for purposes of illustration only and do not limit the scope of the disclosure.

DETAILED DESCRIPTION

Time division multiple access (TDMA) networks allow multiple users to access a network by allowing each user (e.g., terminal) to communicate during a set timeslot. These timeslots can be dynamically allocated depending on demand and/or can have varying lengths. In some embodiments, a network controller can assign available timeslots among various users. A burst time plan can be transmitted from the network controller to the users that specifies which timeslots, if any, each user can use. Burst time plans can be transmitted periodically or randomly. In order to synchronize the network controller and the terminals a global time parameter (TDMA time value) can be included in the burst time plan. The global time parameter can synchronize the time at the terminals and the network controller.

Encryption techniques have been in use with communication networks for some time. Many techniques require that both the sender and receiver both know a key-value (e.g., one-time key-value) that can be used to both encrypt and/or decrypt data. Typically, a key-value can be a unique and/or random number that is combined with the data (e.g., using logical XOR) to encrypt and/or decrypt the data. Because the key-value must be known by both parties, some communication overhead in the communication can be required in order to specify the key-value. Embodiments of the present invention include methods and/or systems that use at least a portion of the TDMA time value as the key-value and/or to create a key-value. Using the TDMA time value to specify a key-value, as the key-value, or to create a key-value can decrease system overhead.

Figure 1:
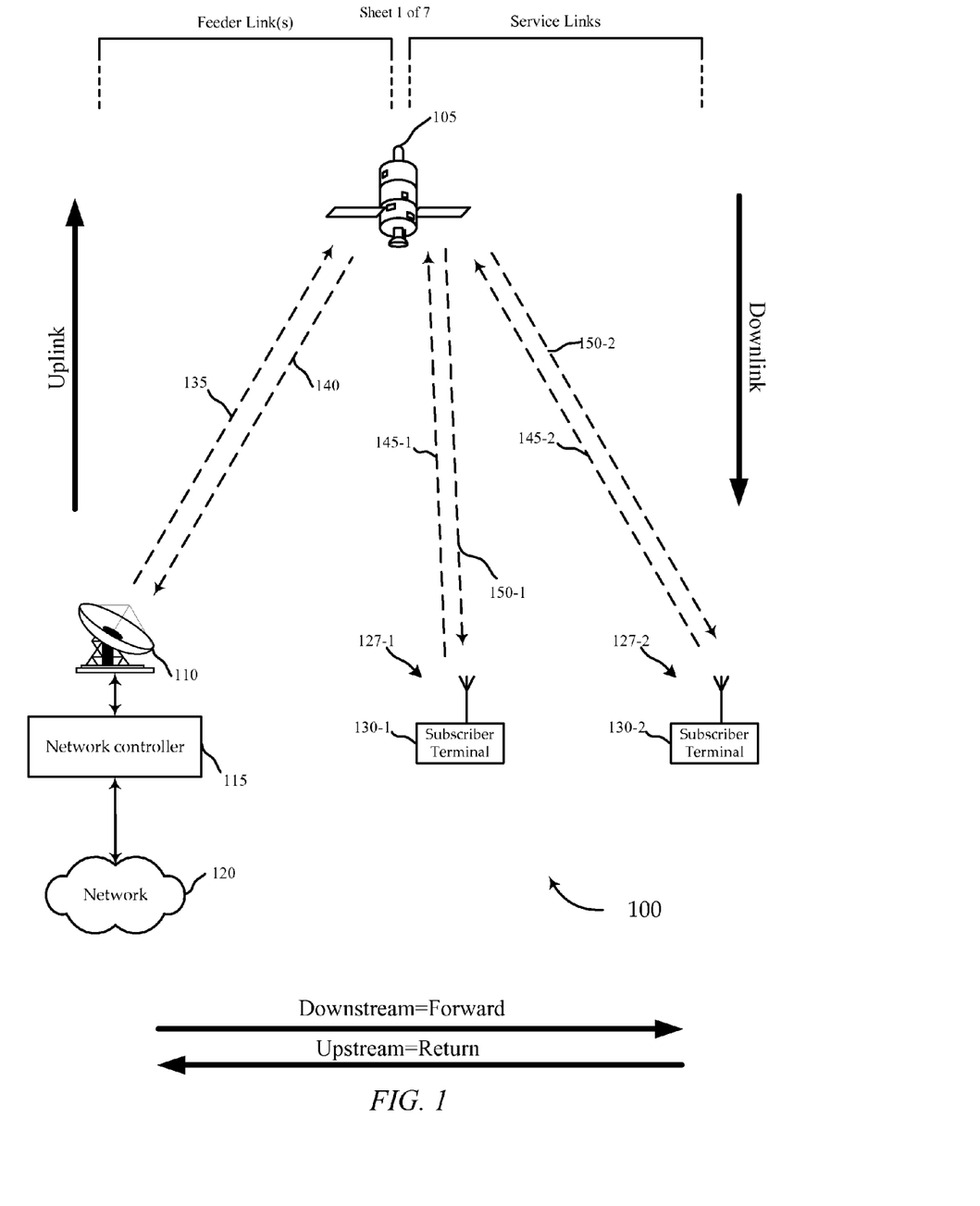
FIG. 1 shows a satellite communication system according to some embodiments.

Some embodiments of the invention can be particularly useful for encrypted TDMA communication in a satellite network. FIG. 1 shows satellite system 100 that is an example of a communication system that can implement various embodiments of the invention. As shown, network controller 115 can communicate with various subscriber terminals 130 through satellite 105. In this embodiment, network controller 115 is coupled with communication network 120, for example, the Internet. In some embodiments, communication network 120 can include a private computer network, a computer system, and/or servers. Network controller 115 can use a satellite dish 110 to bi-directionally communicate with a satellite 105 on a feeder link. An upstream forward link 135 communicates information from the network controller 115 to satellite 105, and downstream return link 140 communicates information from satellite 105 to network controller 115. Although not shown, there may be a number of network controllers 115 in system 100.

Satellite 105 could perform switching or be a bent-pipe. Information can bi-directionally pass through the satellite 105. Satellite 105 could use antennas or phased arrays when communicating. The communication could be focused into spot beams or more broadly cover a bigger geographical area, for example, the entire continental US (CONUS).

Subscriber terminal 130 in this example can be bi-directionally coupled with satellite 105 and can provide connectivity with network 120 through network controller 115. Subscriber terminal 130 can receive information with forward downlink 150 from satellite 105, and transmit information is sent on a number of return uplinks 145. Subscriber terminal 130 can initiate return uplink 145 to send information upstream to satellite 105 and ultimately the network controller 115.

Multiple subscriber terminals 130 can communicate with network controller 115 using various time multiplexing techniques. For example, time division multiple access, dynamic TDMA, multi-frequency time division multiple access (MFTDMA), ALOHA, dynamic TDMA, etc. Moreover, various encryption and/or multiplexing techniques can be used in conjunction with a time division multiplexing techniques.

While embodiments of the invention may be particularly useful in satellite communication networks, any other type of communication network can employ embodiments of the invention described herein. For example, embodiments of the invention can be implemented in any type of communication system.

In some embodiments, various parameters used to coordinate time division communication can be used as or used to create various encryption parameters, such as counter value and/or a one-time key. TDMA is a channel access method for shared medium networks, such as satellite system 100 shown in FIG. 1. TDMA can allow several users to share the same frequency channel by dividing the signal into different timeslots. Users can transmit in rapid succession, one after the other, each using a previously defined timeslot. TDMA can allow multiple stations to share the same transmission medium (e.g. radio frequency channel) while using only a part of its channel capacity. In dynamic TDMA, a scheduling algorithm can be used to dynamically reserve timeslots in each frame to variable bit-rate data streams, based on the traffic demand of each data stream. In multi-frequency TDMA, various frequency channels can be utilized during a single timeslot. In some embodiments, the same terminal or different terminals can use more than one frequency channel during a single timeslot to communicate.

In a system with multiple terminals, a burst time plan (BTP) can be used to specify which timeslot a specific terminal can use to communicate with hub (e.g., network controller 115 in FIG. 1). In embodiments employing frequency multiplexing, the BTP can also specify the frequency band a terminal can use to communicate. In some embodiments, a BTP can specify that a single terminal can communicate using multiple frequency bands within a single timeslot. Moreover, the timeslots can have fixed or variable lengths. The BTP can also establish global timing parameters (e.g., a TDMA time value) that can be used to synchronize timing between the network controller and terminals.

Figure 2:
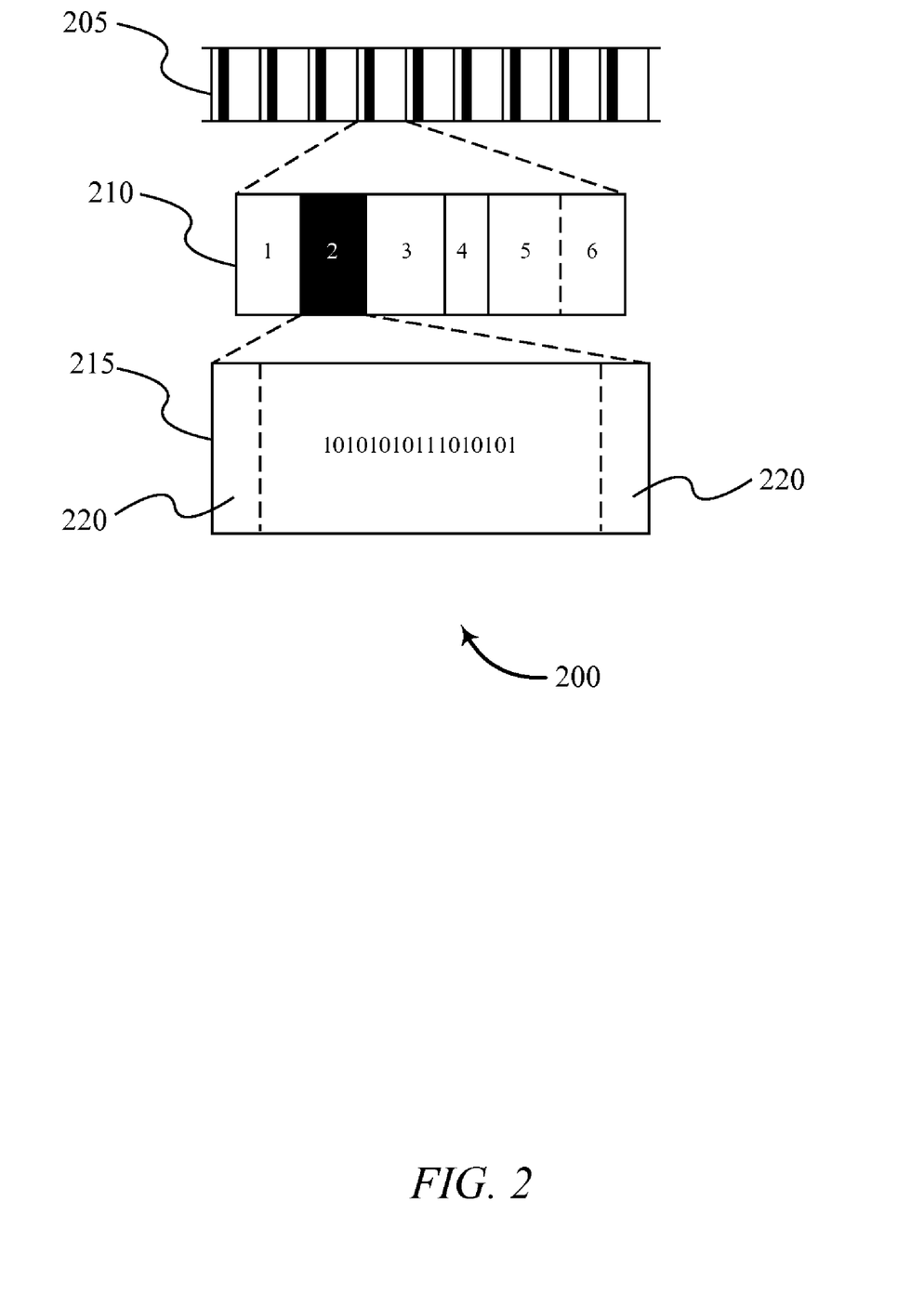
FIG. 2 shows a diagram of channel sharing using time division multiple access protocols according to some embodiments.

FIG. 2 shows a diagram 200 representing frames and timeslots in a TDMA system according to some embodiments. Data stream 205 can be divided into a number of frames 210. Each frame 210 can further be divided into timeslots 215. In a system with many users accessing the same channel, each user can transmit in rapid succession, one after the other, each using a previously defined timeslot 215. Timeslots 215 and/or frames 210 can have a fixed length and/or a variable length. Moreover, each time frame 210 and or slot 215 can have a different size or the same size. As shown in FIG. 2. Each frame 210 is divided into 6 timeslots 215. In some embodiments each user is assigned a specific timeslot 215 in which to communicate. In some embodiments, the same user can be assigned multiple timeslots 215. In some embodiments, each timeslot can be subdivided into multiple frequencies (MFTDMA: multiple frequency time division multiple access), allowing the same or different users to communicate on different frequencies within each timeslot 215. Guard periods 220 can be included at the beginning and end of each frame to ensure that distinct transmissions do not interfere with one another. Guard periods can introduce immunity to propagation delays, echoes and reflections.

TDMA methods can allow multiple stations to share the same channel while only allowing a single terminal to only use a portion of the channel's capacity. In dynamic TDMA, a scheduling algorithm can be used to dynamically reserve or assign timeslots in each frame to variable bit-rate data streams, based on the traffic demand of each data stream. In multi-frequency TDMA, various frequency channels can be utilized during a single timeslot. In some embodiments, the same terminal or different terminals can use more than one frequency channel during a single timeslot to communicate.

Figure 3:
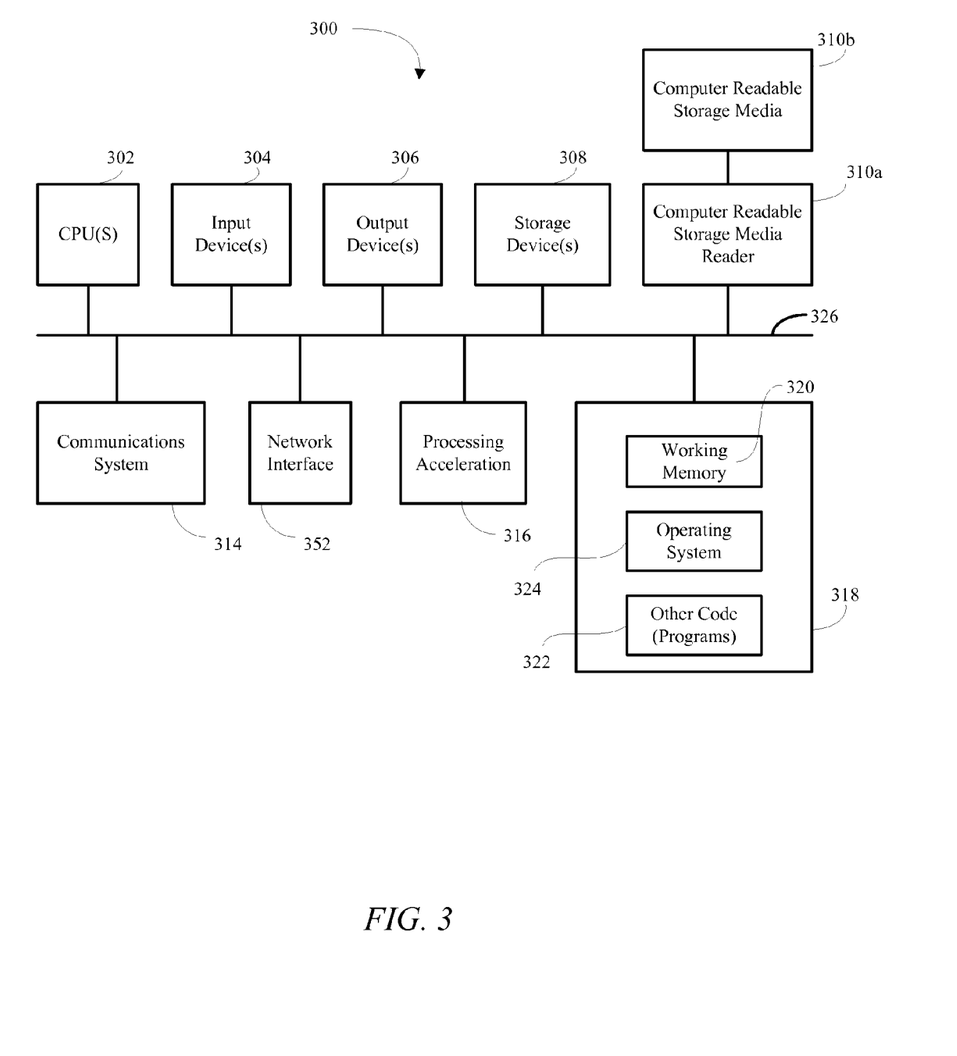
FIG. 3 shows a simplified block diagram of a computation system that can be employed in whole or in part at a network controller, gateway and/or a terminal according to some embodiments.

In a system with multiple terminals, a burst time plan (BTP) can be used to specify which timeslot a specific terminal can use to communicate with hub (e.g., network controller 115 in FIG. 1). Moreover, any other type of control message can be used to communicate timing from a network controller to terminals within the network. In embodiments employing frequency multiplexing, the BTP can also specify the frequency band a terminal can use to communicate. In some embodiments, a BTP can specify that a single terminal can communicate using multiple frequency bands within a single timeslot. Moreover, the timeslots can have fixed or variable lengths. The BTP can also establish global timing parameters (e.g., TDMA time value) that can be used to synchronize timing between the network controller and terminals. In some embodiments, the BTP can also indicate FIG. 3 shows a simplified block diagram of a computation system 300 that can be employed in whole or in part at a network controller 115 and/or a terminal 130 according to some embodiments. Computer system 300 can be used to perform any or all the methods shown, for example, in FIG. 5, FIG. 6, and/or FIG. 7. The drawing illustrates how individual system elements can be implemented in a separated or more integrated manner. The computation system 300 is shown having hardware elements that are electrically coupled via bus 326. Network interface 352 can communicatively couple the computational device 300 with another computer, for example, through network 120 such as the Internet. The hardware elements can include a processor 302, an input device 304, an output device 306, a storage device 308, a computer-readable storage media reader 310a, a communications system 314, a processing acceleration unit 316 such as a DSP or special-purpose processor, and memory 318. In some embodiments, communications system 314 can be communicatively coupled with satellite dish 110 or antenna 127. The computer-readable storage media reader 310a can be further connected to a computer-readable storage medium 310b, the combination comprehensively representing remote, local, fixed, and/or removable storage devices plus storage media for temporarily and/or more permanently containing computer-readable information.

The computer system 300 also comprises software elements, shown as being currently located within working memory 320, including an operating system 324 and other code 322, such as a program designed to implement methods and/or processes described herein. In some embodiments, other code 322 can include software that provides instructions for receiving user input from a dual polarization radar system and manipulating the data according to various embodiments disclosed herein. In some embodiments, other code 322 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

In some embodiments, communication between a terminal and a network controller can be encrypted using any of various encryption schemes known in the art. Some encryption techniques can require that both the network controller and the terminal use a key known by both systems in order to encrypt and decrypt the data. For example, in one-time pad cryptography a key-value is modularly added to the data to create the encrypted data. To decrypt the encrypted data the same key-value would need to be used. In some implementations of one-time pad cryptography, each key-value can be required to be random and/or unique. In systems employing one-time pad cryptography, both the encryptor and the decryptor must know the key-value. In some implementations, communications can transmit the key-value separately or can send an indication of where the key-value can be located within a large database of key-values. Regardless, of the method, communicating information about the key-value can increase communication overhead.

In some embodiments of the invention, TDMA time values within the BTP can be used, in part, to generate the key-value. The TDMA time value indicated in the BTP should be a unique number that should never repeat. The TDMA time value, and possibly other values can be randomized using any encryption function (e.g., a one way function) to create a unique and random key-value that can be modularly added to the data for encryption. In some embodiments, the TDMA time value can be one portion of a counter value that can be used to create a key-value.

Figure 4:
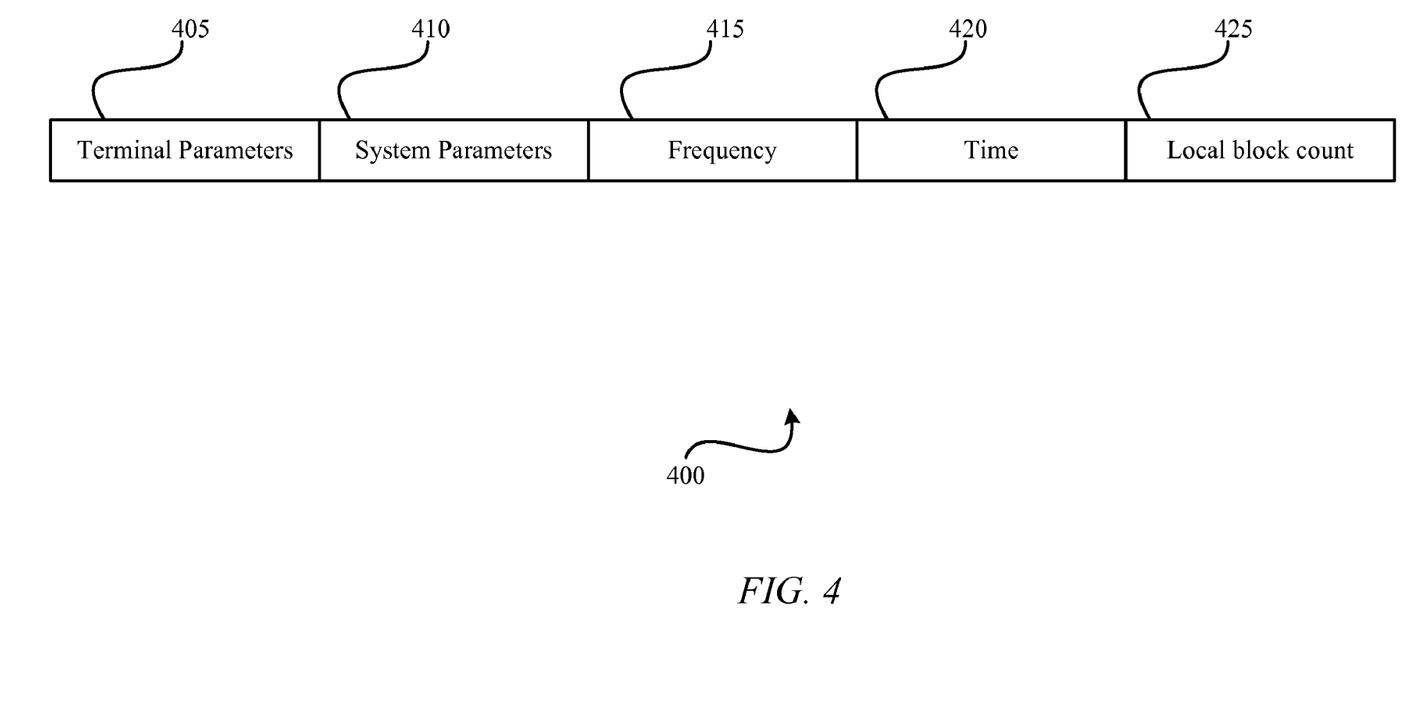
FIG. 4 shows a block diagram of an example of a counter value according to some embodiments.

FIG. 4 shows counter value 400 that can be used in embodiments of the invention. In this example counter value 400 includes terminal parameters 405, system parameters 410, frequency value 415, TDMA time values 420, and/or local block count 425. In some embodiments, other parameters can be used. In some embodiments, one or more parameters can be used. While each parameter shown in FIG. 4 is shown to have the same length, the values can be of any length depending on the implementation. For example, counter value 400 can include 128 bits. In some embodiments, TDMA time value 420 can include 64 bits and/or frequency 410 can include 8 bits.

In some embodiments, terminal parameters 405 can include a value indicating a terminal type and/or terminal location. In some embodiments, terminal parameters 405 can include a unique value for each terminal. Terminal parameters 405 can include any number of bits or bytes. In some embodiments, terminal parameter 405 can include zero bytes, one byte, two bytes, three bytes, or four or more bytes.

In some embodiments, system parameters 410 can include parameters that indicate the type of satellite network in use. In some embodiments, system parameters 410 can indicate network controller identifiers. Any number of bits or bytes can be used. For example, system parameters can be zero bytes, two bytes, three bytes, or four or more bytes.

In some embodiments, frequency value 415 can include the frequency of the communication. For example, the frequency value can be number of megahertz or kilohertz of the channel being used. In some embodiments, frequency value 415 can include a reference value that indicates the frequency being used. The frequency reference value can be dictated by the BTP and/or known by both the terminal and the network controller. For example, a lookup table can be employed that links a reference value with a frequency. In some embodiments, the frequency value 415 can be 42 bits and can indicate the frequency in Hertz. In some embodiments, the frequency value 415 can be as few as 4 bits to indicate the reference number of the frequency being used. Moreover, frequency reference value can include a bit mask that identifies the carrier frequency.

In some embodiments, TDMA time value 420 can include the burst time. The burst time can be dictated by the BTP. In some embodiments, TDMA time value 420 can be 64 bits.

In some embodiments, local block counter 425 can count the number of counter values 400 used to create a full counter value. For example, if the data string being sent during one-timeslot is 1024 bits and the counter value is 128 bits; then 8 counters will be needed. Because the entire 1024 bits will be transmitted during a single timeslot, the TDMA time value will not be different for 8 different counter values. The local block counter 425 can increment for every counter value used. The counter values (128 bits) can then be linked, head to tail or tail to head, to create full counter of the proper length (1024 bits). The full counter value can then be used to generate a key-value that can be used to encrypt the data. In some embodiments, local block counter can include four bytes or 8 bytes.

Figure 5:
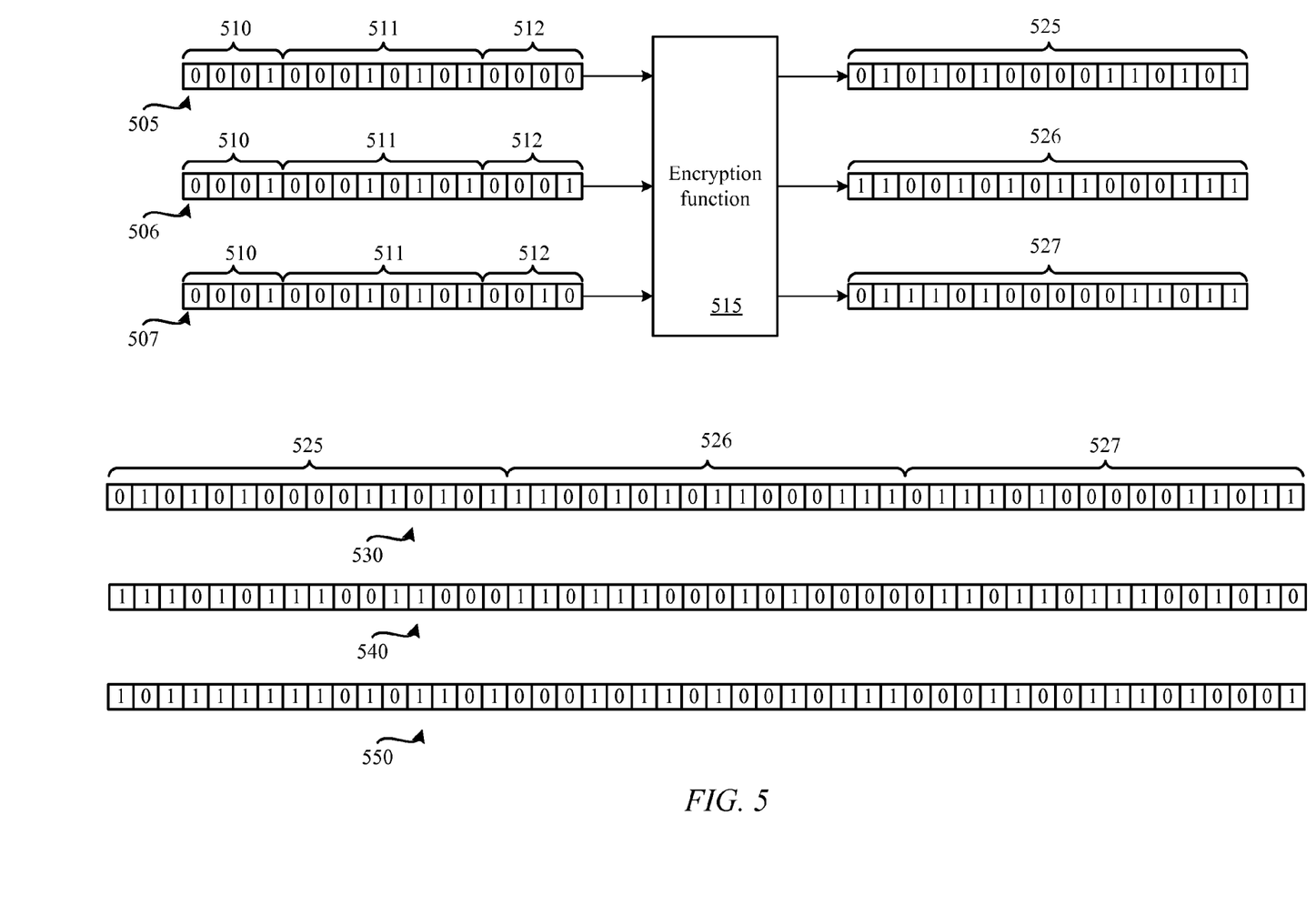
FIG. 5 shows a simplified process for constructing an encryption key and encrypting data using the encryption key according to some embodiments.

FIG. 5 shows an example of combining counter values to produce a key-value and encrypt data with a length longer than the counter value. Three counter values 505, 506, 507 are shown each containing 16 bits. The counter values include a block counter section 512, a TDMA time value section 511, and a carrier frequency section 510. As can be seen each TDMA time value 511 and frequency 510 are the same.

TDMA time value 511 changes from burst time plan to burst time plan. However, if the multiple counter values are required for each timeslot, each counter value will have the same TDMA time value. Each block counter 512 is different. In some embodiments, each block counter is simply an increment of the previous counter. Each counter value 505, 506, 507 are used to create a one-time key-value using an encryption function 515.

Encryption function 515 can be any one-to-one, one-way function, a block encryption function, a hash function, and/or any cryptographic encryption function known in the art. For example, an encryption function can be a MD function, a SHA function, a RIPEMD function, a HAVAL function, a PANAMA function, a Tiger function, and/or a Whirlpool functions can be used. Any other type of encryption function can be used. In some embodiments, encryption function 515 can be implemented in a FPGA, a controller, or by a processor. Encryption function 515, for example, can be a block cipher function that operates on a 128 bit counter value. In other embodiments, encryption function 515 can encrypt streaming block counters. In some embodiments, encryption function can encrypt blocks of data at a time.

Encryption function can take the counter values 505, 506, 507 and return unique and/or seemingly random key-values 525, 526, 527. key-values 525, 526, 527 can be linked together to create a master counter value 530 by placing the key-values head to tail or tail to head. The master counter value 530 and data 540 can be combined with the exclusive disjunction operator (XOR) to produce encrypted data 550. Various other operators can be used to create the encrypted data 550 from data 540 and the master counter value 530. In some embodiments, the counter values can be combined prior to being encrypted using one-time pad function.

The values shown in FIG. 5 can be streaming values. For example, encryption function 515 can receive streaming counter values to create a stream of one-time key-values. These streaming one-time key-values can encrypt a stream of data from a user.

Figure 6:
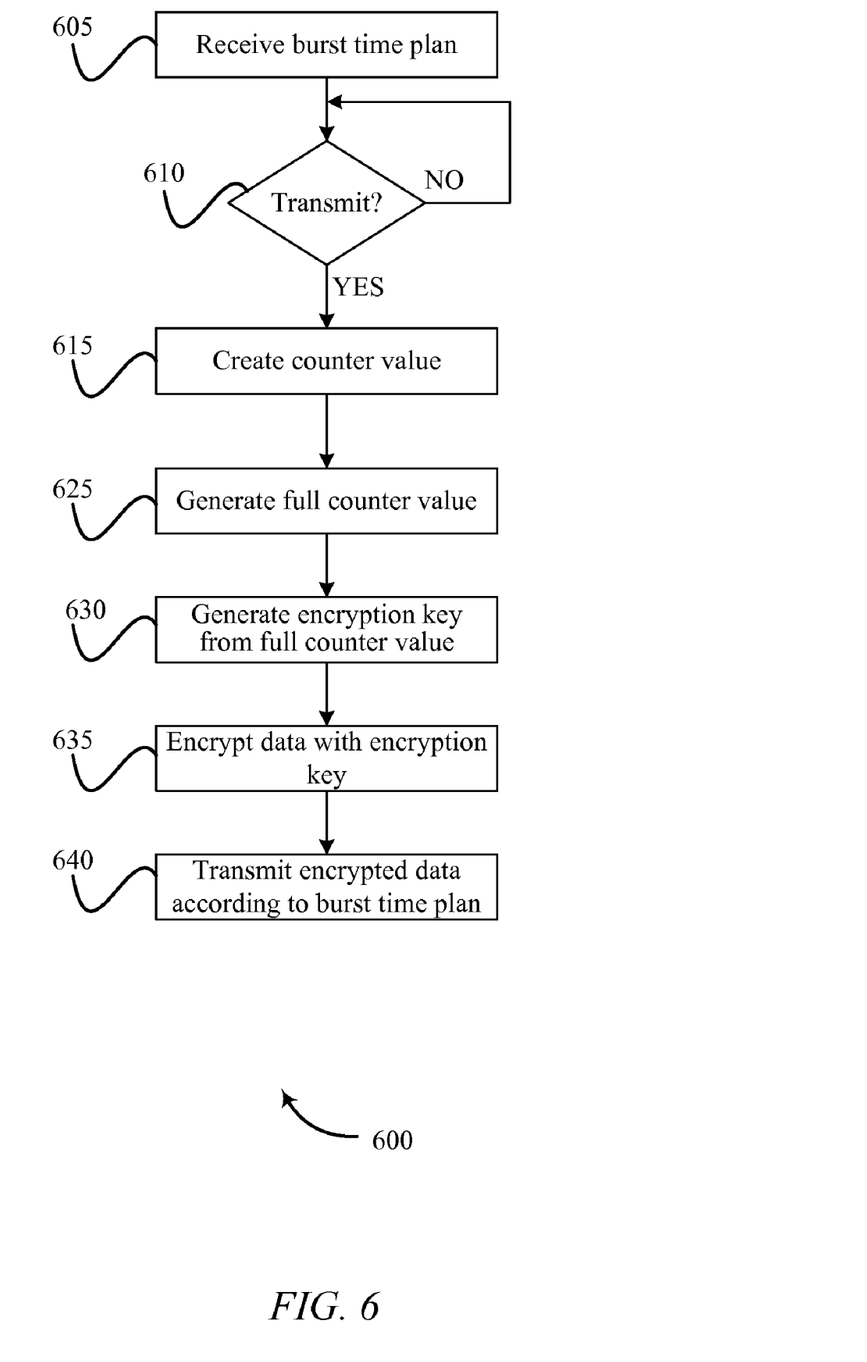
FIG. 6 shows a flowchart for encrypting data according to some embodiments.

FIG. 6 shows a flowchart of process 600 for encrypting data at a terminal according to some embodiments of the invention. A burst time plan is received at a terminal at block 605. The terminal can be a modem or any other type of terminal. The burst time plan can include a TDMA time value. In some embodiments, the burst time plan can be transmitted at random or set time periods. At block 610, process 600 can determine whether there is data to be transmitted. If there is no data to be transmitted, then process 600 waits until there is data to transmit.

If there is data to transmit as determined at block 610, the counter value can be created at block 615. In some embodiments, the TDMA time value can be extracted, in part, from the burst time plan and used to create the counter value. In some embodiments, the counter value can be constructed using data from the burst time plan such as the TDMA time value as well as the carrier frequency. In some embodiments, other parameters for the counter value can be retrieved from memory. The format of the counter value can vary from implementation to implementation. In some embodiments, however, the format of the counter value can be known at each terminal and at the network controller. In some embodiments, the format of the counter value can vary from terminal to terminal within a communication network. In some embodiments, the only requirement is that the network controller knows how each terminal constructs their counter value.

In some embodiments, the counter value is much shorter than the length of the data. Multiple counter values can be appended one to another, each with a local block counter incremented to create a full (or master) counter value that is at least as long as the data at block 625. At block 630 the full counter value can be encrypted creating an encryption key. Any type of encryption function can be used at the terminal. In some embodiments, different terminals can use different encryption functions to create a unique and/or random encryption key from the full counter value. The encryption key can be used at block 635 to encrypt the data, for example, using an XOR operand. Various other operands can be used to create the encrypted data from the data and the encryption key. The encrypted data can then be transmitted to a network controller or another location. The network controller can decrypt the data by knowing the counter value and the function used to encrypt the counter value.

Figure 7:
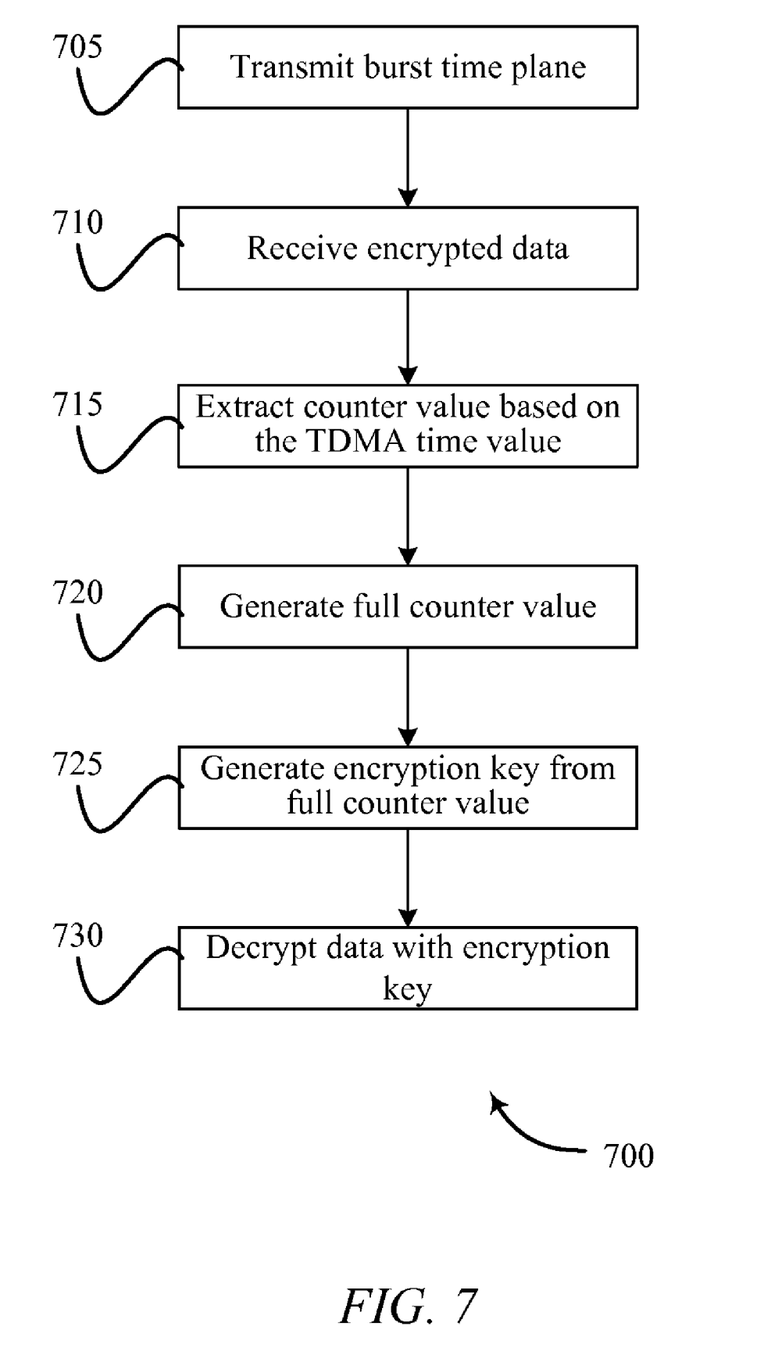
FIG. 7 shows a flowchart for decrypting data according to some embodiments.

FIG. 7 shows a flowchart of a process 700 for decrypting data at network controller according to some embodiments. At block 705 the burst time plan can be transmitted to the various terminals within the system. The burst time plan can include the TDMA time value. At block 710 encrypted data can be received from a terminal. While the network controller can receive data from a plurality of terminals during their assigned timeslots, for simplicity process 700 describes decrypting data from a single terminal. Process 700 can be expanded to decrypt data from each terminal. A counter value can be extracted and/or created at block 715. The counter value can be created, for example, from any of the TDMA time value, the carrier frequency, system parameters, a block counter value, and/or terminal parameters.

At block 720 a full counter value can be created. The full counter value can include multiple counter values each with different block counter values. An encryption key can be created at block 725 using an encryption function on the full counter value. As noted above various encryption functions can be used, what can be important is that the network controller knows the encryption function associated with a particular terminal. The encryption function can be used to create a unique and/or seemingly random number from the full counter value. Thus, by using the TDMA time value and/or the carrier frequency along with any other parameters a unique counter value can be created that is known by both the terminal and the network controller that can be encrypted into a seemingly random number and used to encrypt or decrypt the data. The received encrypted data can be used at block 730 to decrypt the encrypted data. In some embodiments, the encrypted data and the encryption key are operated on using the exclusive disjunction operator (XOR) to produce the data.

In some embodiments, TDMA time values can be replaced with unique burst id values. For example, each burst can be required to have a unique burst id that is known by both the transmitter and the receiver. The transmitter or receiver can identifier an initial burst, with an initial burst id. Each subsequent burst can have an incremented burst id. The transmitter and/or receiver can use at least the burst id to create a one-time key-value that can be used as described above.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the satellite network, terminals and network controller systems have been described herein with reference to particular blocks, it is to be understood that the blocks are defined for convenience of description and are not intended to imply a particular physical arrangement of component parts. Further, the blocks need not correspond to physically distinct components.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or digital versatile disk (DVD), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

What is claimed is:

1. A method for encrypting data in a TDMA communication system at a transmitting terminal, the method comprising:
   receiving a transmit TDMA timeslot assignment, with a TDMA time value, from a TDMA controller;
   receiving data from a user;
   calculating a one-time key-stream from at least the TDMA time value using a controller;
   encrypting the data using the one-time key-stream to produce encrypted data with the controller; and
   transmitting the encrypted data to a receiver.

2. The method according to claim 1, wherein the TDMA communication system comprises a multi-frequency TDMA communication system.

3. The method according to claim 1, wherein the one-time key-stream is calculated from a plurality of counter values.

4. The method according to claim 1, wherein the calculating a one-time key-stream comprises:
   creating a counter value from the TDMA time value; and
   calculating a one-time key-stream from the counter value using a block encryption function.

5. The method according to claim 4, wherein the counter value is created by combining the TDMA time value with one or more values selected from the group consisting of a transmission frequency representation, a system parameter, a block counter value, and a terminal parameter.

6. The method according to claim 1, wherein a subsequent counter value is created by incrementing the previous counter value.

7. The method according to claim 1, wherein the encrypting the data using the one-time key-stream further comprises creating the encrypted value using an exclusive disjunction function.

8. A method for decrypting data in a TDMA communication system at a TDMA controller, the method comprising:
   receiving a receive TDMA timeslot assignment that includes a TDMA time value, from a TDMA controller;
   receiving encrypted data from a transmitting terminal;
   calculating a one-time key-stream from at least the TDMA time value using a controller;
   decrypting, with the controller, the encrypted data using the one-time key-stream producing decrypted data; and
   transmitting the decrypted data to a user.

9. The method according to claim 8, wherein the one-time key-stream is calculated by encrypting the TDMA time value.

10. The method according to claim 8, wherein the one-time key-stream is calculated by encrypting a plurality of counter values.

11. The method according to claim 8, wherein the one-time key-stream is calculated using the TDMA time value and at least one value selected from the group consisting of a transmission frequency representation, a system parameter, and a terminal parameter.

12. The method according to claim 9, wherein a subsequent counter value is created by incrementing a previous counter value.

13. The method according to claim 8, wherein decrypting the data using the one-time key-stream further comprises creating the decrypted value using an exclusive disjunction function.

14. A method for decrypting data in a communication network, the method comprising:
   transmitting a burst time plan to both the transmitting and the receiving terminals within a network of terminals, the burst time plan including at least a TDMA time value and specifying a timeslot within which the transmitting terminal should transmit data;
   receiving encrypted data from the transmitting terminal within the timeslot specified by the burst time plan;
   creating a counter value from at least the TDMA time value using a controller;
   calculating a one-time key-stream from the counter value using the controller; and
   decrypting, with the controller, the encrypted data using the one-time key-stream.

15. The method according to claim 14, wherein consecutive counter values are incremented.

16. The method according to claim 14, wherein the counter value is created using a value selected from the group consisting of a transmission frequency representation, a system parameter, and a terminal parameter.

17. The method according to claim 14, wherein the one-time key stream is calculated from the counter value using a one-way function.

18. The method according to claim 14, wherein the one-time key stream is calculated from the counter value using a block encryption function.

19. The method according to claim 14, wherein the decrypting the encrypted data using the one-time key-value includes using an exclusive disjunction function.

20. A method for encrypting data in a communication network, the method comprising:
   receiving a TDMA time value;
   receiving data from a source distinct from the source of the TDMA time value;
   calculating, with a controller, a one-time key-value from at least the TDMA time value;
   encrypting the data, with the controller, using the one-time key-value; and
   transmitting the encrypted data.

21. The method according to claim 20, wherein the one-time key-value includes at least one value selected from the group of values consisting of a system identification value, a terminal identification value, and a carrier frequency value.

22. A communication modem comprising:
   a user port configured to receive data from a user;
   a network communications port;

a controller communicatively coupled with the user port and the network communications port; and memory communicatively coupled with the controller, the memory including instructions executable by a processor, wherein the instructions include:

instructions to receive user data through the user port;

instructions to receive a burst time plan and store at least portions of the burst time plan in the memory, wherein the burst time plan includes a global time value;

instructions to calculate a one-time key-value from the global time value;

instructions to encrypt the user data with the one-time key-value; and instructions to send the encrypted user data to a communications network using the network communications port.

23. The communication modem according to claim 22, wherein the burst time plan includes an indication specifying a timeslot within which the communication modem should transmit the encrypted user data.

24. The communication modem according to claim 22, wherein the instructions to calculate a one-time key-value from the global time value include instructions to calculate a one-time key-value from the global time value using a one-way function.

* * * * *